United States Patent
Lin et al.

(10) Patent No.: US 9,507,747 B2
(45) Date of Patent: Nov. 29, 2016

(54) DATA DRIVEN COMPOSITE LOCATION SYSTEM USING MODELING AND INFERENCE METHODS

(75) Inventors: Jyh-Han Lin, Mercer Island, WA (US); Gursharan Singh Sidhu, Seattle, WA (US); Sindhura Bandhakavi, Redmond, WA (US); Pradipta Kumar Basu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1021 days.

(21) Appl. No.: 13/289,543

(22) Filed: Nov. 4, 2011

(65) Prior Publication Data

US 2013/0116965 A1    May 9, 2013

(51) Int. Cl.
| | |
|---|---|
| *G01S 1/00* | (2006.01) |
| *G06F 15/00* | (2006.01) |
| *G01S 5/02* | (2010.01) |
| *H04W 64/00* | (2009.01) |

(52) U.S. Cl.
CPC ............... *G06F 15/00* (2013.01); *G01S 5/021* (2013.01); *G01S 5/0252* (2013.01); *G01S 5/0263* (2013.01); *H04W 64/00* (2013.01)

(58) Field of Classification Search
CPC ................................. G06F 15/00; G01S 5/021
USPC .............................................................. 702/150
See application file for complete search history.

(56) References Cited

U.S. PATENT DOCUMENTS

| | | | |
|---|---|---|---|
| 6,820,089 B2 | 11/2004 | Vishnubhotla | |
| 7,272,617 B1 | 9/2007 | Bayer et al. | |
| 7,397,424 B2 * | 7/2008 | Houri | 342/357.31 |
| 7,512,519 B2 | 3/2009 | Hrischuk et al. | |
| 7,562,058 B2 | 7/2009 | Pinto et al. | |
| 7,599,790 B2 | 10/2009 | Rasmussen et al. | |
| 7,756,881 B2 | 7/2010 | Crivat et al. | |
| 2003/0130899 A1 | 7/2003 | Ferguson et al. | |
| 2007/0126635 A1 * | 6/2007 | Houri | 342/451 |
| 2007/0202888 A1 * | 8/2007 | Brachet et al. | 455/456.1 |

(Continued)

OTHER PUBLICATIONS

Liu, et al., "Scalable and Mashable Location-Oriented Web Services", Retrieved at <<http://dret.net/netdret/docs/wilde-icwe2010-restful-lbs.pdf>>, Proceedings of the 10th international conference on Web engineering, Jul. 5-9, 2010, pp. 15.

(Continued)

*Primary Examiner* — Sujoy Kundu
*Assistant Examiner* — Ricky Ngon
(74) *Attorney, Agent, or Firm* — Miia Sula; Judy Yee; Micky Minhas (57) ABSTRACT

Embodiments respond to a position inference request from a computing device to determine a location of a computing device. The position inference request received from the computing device identifies a set of beacons observed by the computing device. A geographic area is estimated in which the computing device is located using the set of beacons. At least one location method is selected to identify a location of the computing device within the geographic area. In some cases two or more location methods may be employed and their results combined using, for example, a weighting function. The location of the computing device is determined within the geographic area using the set of beacons and the selected location method(s). The location that is determined is communicated to the computing device.

8 Claims, 9 Drawing Sheets

(56) References Cited

U.S. PATENT DOCUMENTS

| | | | |
|---|---|---|---|
| 2007/0229311 | A1 | 10/2007 | Bowman et al. |
| 2009/0281830 | A1 | 11/2009 | McNames et al. |
| 2010/0054527 | A1 | 3/2010 | Kirmse et al. |
| 2010/0070335 | A1 | 3/2010 | Parekh et al. |
| 2010/0098342 | A1 | 4/2010 | Davis et al. |
| 2011/0003425 | A1 | 1/2011 | Morrison et al. |
| 2011/0035420 | A1 | 2/2011 | Alizadeh-Shabdiz et al. |
| 2013/0310064 | A1* | 11/2013 | Brachet et al. ............ 455/456.1 |

OTHER PUBLICATIONS

"Shape and nonrigid motion estimation through physics-based synthesis", Retrieved at <<http://cs.ucla.edu/~dt/papers/pami93a/pami93a.pdf, IEEE Transactions on Pattern Analysis and Machine Intelligence, vol. 15, No. 6, Jun. 1993, pp. 580-591.

"X-TRACT Data Analysis and Dynamic Display", Retrieved at <<http://verint.com/communications_interception/section2b.cfm?article_level2_category_id=7&article_level2a_id=227&article_level2b_id=591>>, Retrieved Date: Apr. 1, 2011, pp. 3.

"Using location analytics to mine mobile location data for user segmentation", Retrieved at <<http://news.thewherebusiness.com/content/using-location-analytics-mine-mobile-location-data-user-segmentation>>, Jul. 1, 2010, pp. 3.

Steiner, James, "Business Intelligence and GIS, Systems within Systems, and Ubiquity", Retrieved at <<http://www.b-eye-network.com/view/7956>>, Jul. 9, 2008, pp. 3.

"Partitioning Data into Training and Testing Sets (Analysis Services—Data Mining)", Retrieved at <<http://msdn.microsoft.com/en-us/library/bb895173.aspx, Retrieved Date: Apr. 1, 2011, pp. 4.

"Openwave® Mobile Analytics", Retrieved at <<http://www.openwave.com/sites/default/files/docs/solutions/Mobile_Analytics_021011.pdf>>, Retrieved Date: Apr. 1, 2011, pp. 2.

"Comparison of Modeling and Inference Methods at Multiple Spatial Resolutions", U.S. Appl. No. 13/117,169, filed May 27, 2011, pp. 32.

Singh, et al., "Orion 2.0: Native Support for Uncertain Data", Retrieved at <<http://citeseerx.ist.psu.edu/viewdoc/download?doi=10.1.1.139.1542&rep=rep1&type=pdf>>, Proceedings of the 2008 ACM SIGMOD international conference on Management of data, Jun. 9-12, 2008, pp. 1239-1241.

Yu, et al., "Classifying large data sets using SVM with hierarchical clusters", Retrieved at <<http://hwanjoyu.org/publication/kdd03.pdf>>, Proceedings of the ninth ACM SIGKDD international conference on Knowledge discovery and data mining, 2003, pp. 10.

Cheng, Reynold, "Uncertain Database Management", Retrieved at <<http://www.cs.hku.hk/research/uncertain_database_management.jsp>>, Retrieved Date: Feb. 18, 2010, pp. 4.

Niculescu, et al., "Ad Hoc Positioning System (APS) Using AOA", In Twenty-Second Annual Joint Conference of the IEEE Computer and Communications, vol. 3, Mar. 30, 2003, pp. 1734-1743. (10 pages).

Beal, Matthew James, "Variational Algorithms for Approximate Bayesian Inference", A Thesis Submitted for the Degree of Doctor of Philosophy of the University of London, May 2003, pp. 1-281.

Altay et al., "Revealing Differences in Gene Network Inference Algorithms on the Network Level by Ensemble Methods", In Bioinformatics, vol. 26, Issue 14, May 25, 2010, pp. 1738-1744. (7 pages).

Chen et al., "Novel Centroid Localization Algorithm for Three-Dimensional Wireless Sensor Networks", In 4th International Conference on Wireless Communications, Networking and Mobile Computing, Oct. 12, 2008, 4 Pages.

McDonald, et al., "A Study of Global Inference Algorithms in Multi-document Summarization", In Proceedings of the 29th European Conference on IR research, Apr. 2, 2007, pp. 557-564. (8 pages total).

Bhal, et al., "RADAR: An In-Building RF-based User Location and Tracking System", In Nineteenth Annual Joint Conference of the IEEE Computer and Communications Societies, vol. 2, Mar. 26, 2000, 10 Pages.

"Crowdsourcing Location Information to Improve Indoor Localization", Rogoleva, Swiss Federal Institute of Technology Zurich. Masters Thesis, 2010 (90 pages).

"Cooperative Transit Tracking Using Smartphones", Thiagarajan, 2010, ACM, 978-1-4503-0344, pp. 85-98 (14 pages).

"Introduction to Algorithms": Cormen, 1997, MIT press.

Vander, Stoep Jeffrey, "Design and Implementation of Reliable Localization Algorithms using Received Signal Strength", A Thesis Submitted in Partial Fulfilment of the Requirements for the Degree of Master of Science in Electrical Engineering University of Washington, 2009, Retrieved on: Apr. 30, 2014, 47 Pages.

Zhou, "RFID Localization Algorithms and Applications—A Review", In Journal of Intelligent Manufacturing, vol. 20, Issue 6, Dec. 2009, pp. 695-707 (13 pages).

* cited by examiner

DATA DRIVEN COMPOSITE LOCATION SYSTEM USING MODELING AND INFERENCE METHODS

BACKGROUND

Some existing positioning services provide position information to requesting computing devices based on crowd-sourced data in such systems, the requesting computing devices provide a set of observed beacons and the positioning service returns an inferred approximate position of the requesting computing devices based on the set of observed beacons. The accuracy of the approximate position determined by the positioning service, however, is dependent on the quality of the crowd-sourced data, the modeling algorithms that estimate beacon models (e.g., that model data beacon data structures), and/or the position inference algorithms that calculate the approximate position of the requesting computing device. The crowd-sourced data may be noisy and unreliable due to differences in the devices providing the crowd-sourced data, the locations of the devices, and conditions under which the crowd-sourced data was obtained by the devices (e.g., signal strength, environment type, etc.). Further, one modeling algorithm or position inference algorithm may perform better than another algorithm on a particular set of crowd-sourced data, or in a particular geographic area. Existing systems fail to provide or enable a systematic analysis of crowd-sourced data quality and of performance of the modeling algorithms and the position inference algorithms.

SUMMARY

Embodiments of the disclosure respond to a position inference request from a computing device to determine the position (latitude, longitude, etc.) of a computing device. The position inference request received from the computing device identifies a set of beacons observed by the computing device. A geographic area is estimated in which the computing device is located using the set of beacons. At least one location method is selected to identify a position of the computing device within the geographic area. The position of the computing device is determined within the geographic area using the set of beacons and the selected location method. The position that is determined is communicated to the computing device.

Other Embodiments of the disclosure determine a beacons model using crowd-sourced positioned observations in a training dataset. Each of the crowd-sourced positioned observations includes a set of beacons observed by a computing device and the position at which this observation was made by the computing device. For each of the crowd-sourced positioned observations in a test dataset, a device position estimate is determined based on the beacons model that has been determined from the training dataset. The determined device position estimate is compared to the observation position of the computing device corresponding to the positioned observation in the test dataset to calculate an accuracy value. An aggregate accuracy value is calculated for all positioned observations in the test dataset in each of areas in which the crowd-sourced positioned observations are assigned based on the set of calculated accuracy values of the individual test dataset positioned observations assigned thereto. Data analytics are obtained which characterize the training dataset and the test dataset. The beacons model is adjusted based on the calculated aggregate accuracy values for each of the areas and the data analytics to improve the aggregate accuracy value that is calculated for each of the areas.

Embodiments of the disclosure compare performance of modeling algorithms and position inference algorithms. Crowd-sourced positioned observations are divided into a training dataset and a test dataset. Each of the crowd-sourced positioned observations includes a set of beacons observed by one of a plurality of computing devices, and an observation position of the computing device. The crowd-sourced positioned observations are assigned to one or more geographic areas based on the observation positions associated with each of the crowd-sourced positioned observations and the position associated with each of the geographic areas. A beacons model is estimated based on the positioned observations in the training dataset. For each of the positioned observations in the test dataset a device position estimate is determined based on the determined beacons model. The determined device position estimate is compared to the known observation position of the computing device to calculate a positioning accuracy value. An aggregate accuracy value is calculated for each of the areas based on the calculated accuracy values of the positioned observations assigned thereto from the test dataset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide a systematic positioning service experimentation framework for analyzing the performance of modeling and position inference methods. In some embodiments, the input data is characterized, and correlated, to output analytics accuracy). By assigning the input data to defined geographic areas such as tiles, the output analytics can be analyzed at multiple levels of spatial resolution.

Aspects of the disclosure are operable in an environment in which devices such as mobile computing devices or other observing computing devices 210 observe or detect one or more beacons 212 at approximately the same time (e.g., an observation time value 216) while the device is at a particular location (e.g., an observation position 214). The set of observed beacons 212, the observation position 214, the observation time value 216, and possibly other attributes constitute a positioned observation 102. The mobile computing devices detect or observe the beacons 212, or other cell sites, via one or more radio frequency (RE) sensors associated with the mobile computing devices. Aspects of the disclosure are operable with any beacon 212 supporting any quantity and type of wireless communication modes including code division multiple access (CDMA), Global System for Mobile Communication (GSM), wireless fidelity 4G/Wi-Max, and the like. Exemplary beacons 212 include cellular towers (or sectors if directional antennas are employed), base stations, base transceiver stations, base station sites, wireless fidelity (Wi-Fi) access points, satellites, or other wireless access points (WAPs). While aspects of the disclosure may be described with reference to beacons 212 implementing protocols such as the 802.11 family of protocols, embodiments of the disclosure are operable with any beacon 212 for wireless communication.

Figure 1:
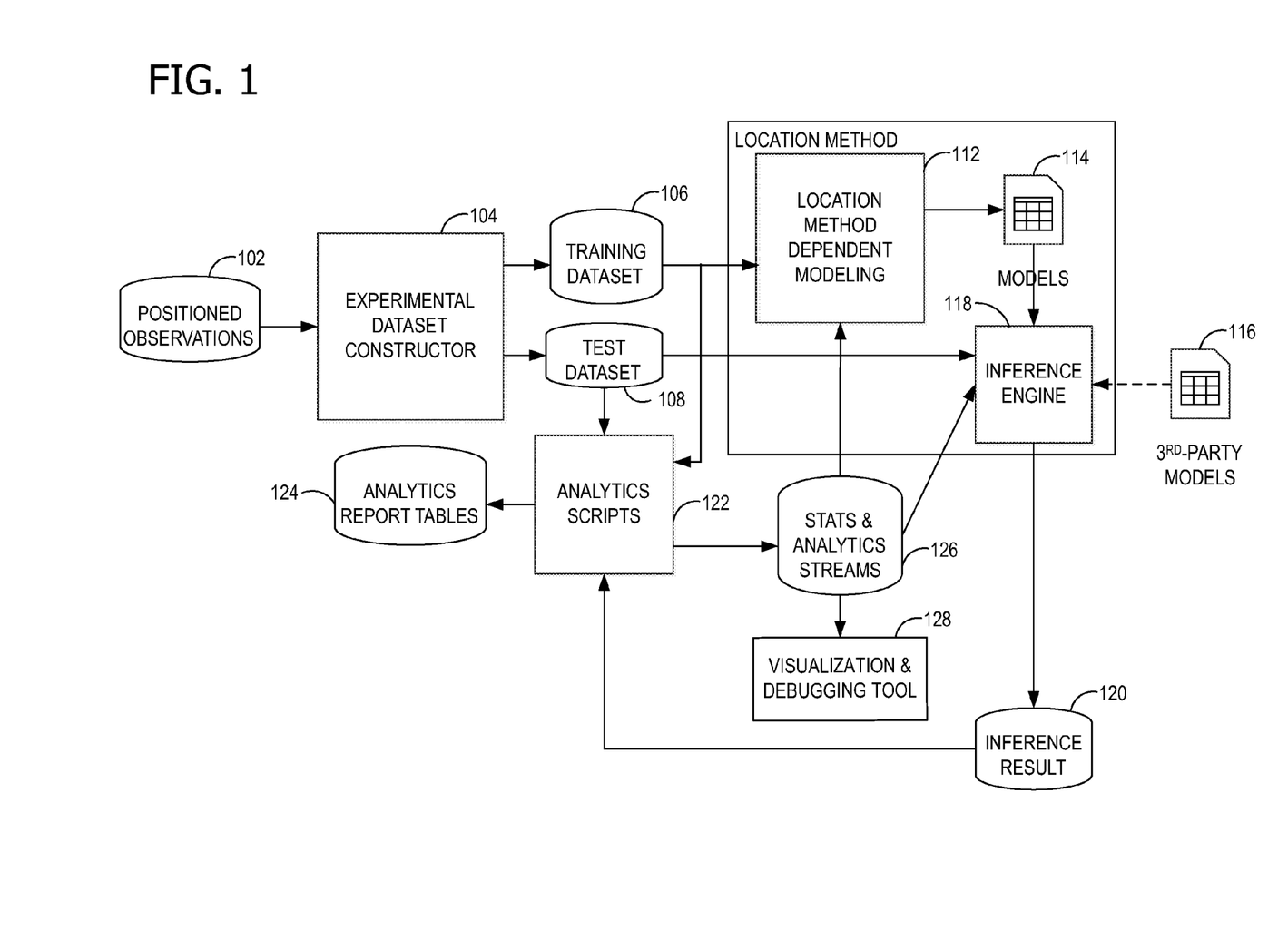
FIG. 1 is an exemplary block diagram illustrating a positioning experimentation framework for analyzing position determination methods using positioned observations divided into a training dataset and a test dataset.

Referring next to FIG. 1, an exemplary block diagram illustrates the position experimentation framework for analyzing position determination methods using positioned observations 102 grouped into a training dataset 106 and a test dataset 108. The training dataset 106 includes training positioned observations, and the test dataset 108 includes test positioned observations. The position experimentation framework includes an experimental dataset constructor 104, which divides positioned observations 102 into the training dataset 106 and the test dataset 108. In some embodiments, the training dataset 106 and the test dataset 108 are mutually exclusive (e.g., no overlap). In other embodiments, at least one positioned observation 102 is included in both the training dataset 106 and the test dataset 108. Using positioning method-dependent modeling 112 (e.g., a modeling algorithm 228 and a position inference algorithm 230) models 114 are constructed from the training dataset 106. The models 114 may include, for example, a set of beacons and the locations of each of the beacons 212. In other implementations, the models 114 may not include beacon location information. Rather, they may include a distribution of some property associated with the beacons such as signal strength, for instance. An inference engine 118 applies at least one of the position inference algorithms 230 to the test dataset 108 and uses the models 111 to infer position inference results 120 such as device position estimates 224 for the observing computing devices 210. In some embodiments, the inference engine 118 also uses third-party models 116 to produce the position inference results 120. The device position estimates 224 represent inferred positions of the observing computing devices 210 in each of the positioned observations 102 in the test dataset 108. Analytics scripts 122 analyze the inference results 120 in view of the training dataset 106 and the test dataset 108 to produce analytic report tables 124 and statistics and analytics streams 126. The analytics scripts 122, in general, calculate the accuracy of the positioning method, such as an error distance. The statistics and analytics streams are used by visualization and debugging tools 128 and by the inference engine 118.

Figure 2:
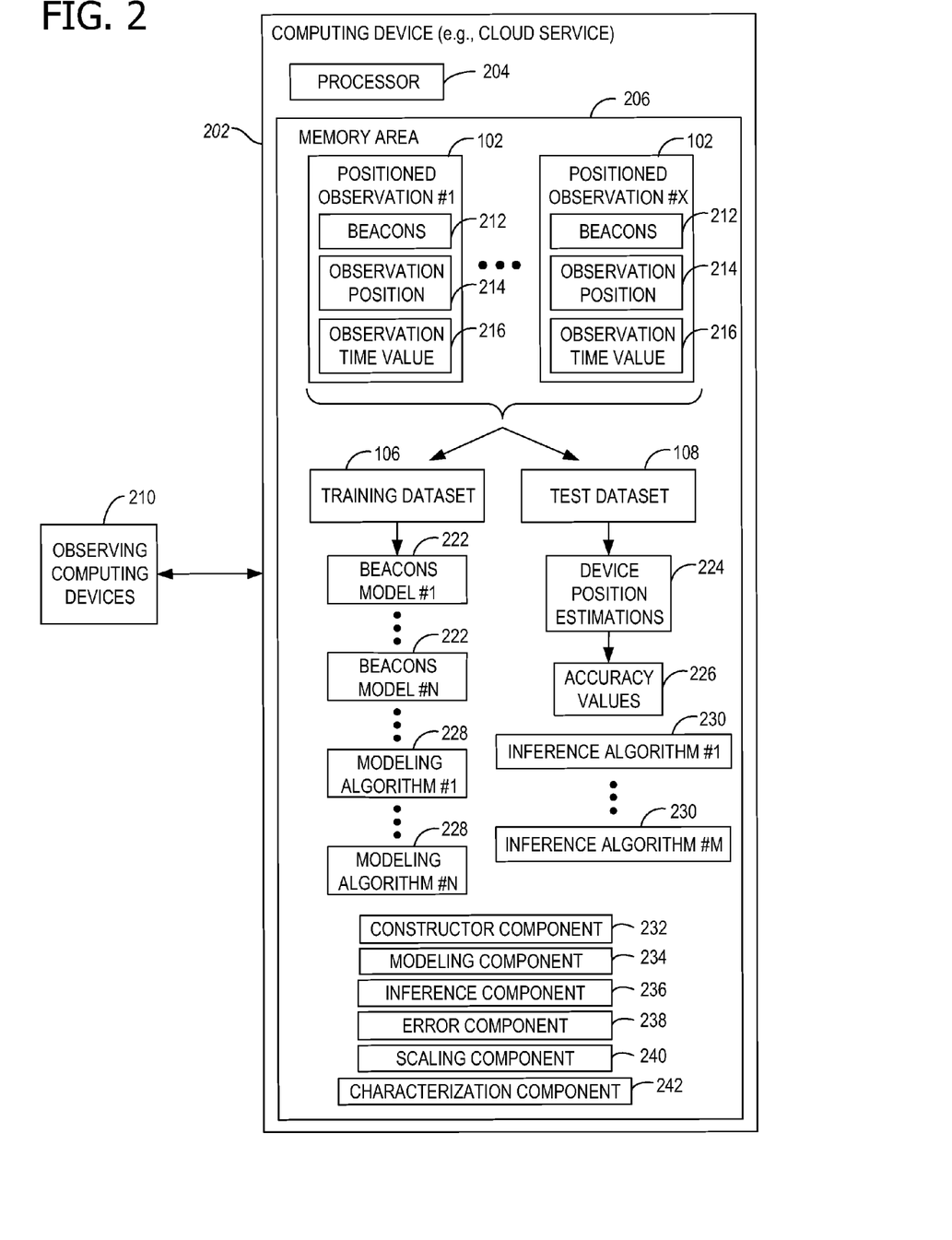
FIG. 2 is an exemplary block diagram illustrating a computing device for analyzing modeling algorithms and position inference algorithms.

Referring next to FIG. 2, an exemplary block diagram illustrates a computing device 202 for analyzing modeling algorithms 228 and position inference algorithms 230. In some embodiments, the computing device 202 represents a cloud service for implementing aspects of the disclosure. For example, the cloud service may be a position service accessing positioned observations 102 stored in a beacon store. In such embodiments, the computing device 202 is not a single device as illustrated, but rather a collection of a plurality of processing devices and storage areas arranged to implement the cloud service.

In general, the computing device 202 represents any device executing instructions (e.g., as application programs, operating system functionality, or both) to implement the operations and functionality associated with the computing device 202. The computing device 202 may also include a mobile computing, device or any other portable device. In some embodiments, the mobile computing device includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

The computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some embodiments, the processor 204 is programmed to execute instructions such as those illustrated in the figures (e.g., FIG. 3 and FIG. 4).

The computing device 202 further has one or more computer readable media such as the memory area 206. The memory area 206 includes any quantity of media associated with or accessible by the computing device 202. The memory area 206 may be internal to the computing device 202 (as shown in FIG. 2), external to the computing, device 202 (not shown), or both (not shown). The memory area 206 stores, among other data, one or more positioned observations 102 such as positioned observation in through positioned observation #X. In the example of FIG. 2, each of the positioned observations 102 includes a set of one or more beacons 212, an observation position 214, an observation time value 216, and other properties describing the observed beacons 212 and/or the observing computing device 210. An exemplary observation position 211 may include values for a latitude, longitude, and altitude of the observing computing device 210. For example, the observation position 214 of the observing computing device 210 may be determined via a global positioning system (GPS) receiver associated with the observing computing device 210.

The computing device 202 may receive the positioned observations 102 directly from the observing computing devices 210. Alternatively or in addition, the computing device 202 may retrieve or otherwise access one or more of the positioned observations 102 from another storage area such as a beacon store. In such embodiments, the observing computing devices 210 transmit, via a network, the positioned observations 102 to the beacon store for access by the computing device 202 (and possibly other devices as well).

The beacon store may be associated with, for example, a positioning service that crowd-sources the positioned observations 102. The network includes any means for communication between the observing computing devices 210 and the beacon store or the computing device 202.

As described herein, aspects of the disclosure operate to divide, separate, construct, assign, or otherwise create the training dataset 106 and the test dataset 108 from the positioned observations 102. The training dataset 106 is used to generate the beacon related data model (e.g., beacons model 222) of the position inference algorithm 230. For some position inference algorithms 230, the model includes beacon position estimates of the beacons 212 therein.

Aspects of the disclosure further calculate, using the beacon models, the estimated positions (e.g., device position estimates 224) of the observing computing devices 210 in the test dataset 108. Each of the device position estimates 224 identifies a calculated position of one of the observing computing devices 210 (e.g., mobile computing devices) in the test dataset 108.

The memory area 206 further stores accuracy values 226 derived from a comparison between the device position estimates 224 and the corresponding observation positions 214, as described herein. The accuracy values 226 represent, for example, an error distance.

The memory area 206 further stores one or more modeling algorithms 228 and one or more position inference algorithms 230. Alternatively or in addition, the modeling algorithms 228 and position inference algorithms 230 are stored remotely from the computing device 202. Collectively, the modeling algorithms 228 and position inference algorithms 230 may be associated with one or more of a plurality of position determination methods, and provided by a positioning service.

The memory area 206 further stores one or more computer-executable components. Exemplary components include a constructor component 232, a modeling component 234, an inference component 236, an error component 238, a scaling component 240, and a characterization component 242. The constructor component 232, when executed by the processor 204, causes the processor 204 to separate the crowd-sourced positioned observations 102 into the training dataset 106 and the test dataset 108. The constructor component 232 assigns the crowd-sourced positioned observations 102 to one or more geographic tiles or other geographic areas based on the observation positions 214 in each of the crowd-sourced positioned observations 102, FIG. 7 includes an illustration of exemplary geographic tiles. In some embodiments, the crowd-sourced positioned observations 102 may be grouped by beacon 212 to enable searching for positioned observations 102 based on a particular beacon 212 of interest.

The modeling component 234, when executed by the processor 204, causes the processor 204 to determine one or more beacons models 222 based on the positioned observations in the training dataset 106.

In embodiments that contemplate beacon position estimation, for each beacon 212, the beacon position estimates are calculated based on the observation positions 214 in the training dataset 106 associated with the beacon 212. That is, aspects of the disclosure infer the position of each beacon 212 based on the positioned observations in the training dataset 106 that involve the particular beacon in the beacons information 212. As a result, in such embodiments, the modeling component 234 generates models 114 including a set of beacons 212 and approximate estimated positions of the beacons 212.

The modeling component 234 implements at least one of the modeling algorithms 228. The modeling algorithms 228 may all use the same or different beacons models. In some cases each modeling algorithm 228 may use a different beacons model.

The inference component 236, when executed by the processor 204, causes the processor 204 to determine, for each of the positioned observations in the test dataset 108, the device position estimate 224 for the observing computing device 210 based on the beacon mode determined by the modeling component 234. The inference component 236 implements the position inference algorithms 230, and is operable with any exemplary algorithm the determining a position of one of the observing computing devices 210 based on the beacons model 222, as known in the art. For each of the positioned observations in the test dataset 108, the inference component 236 further compares the device position estimate 224 for the observing computing device 210 to the known observation position 214 of the observing computing device 210 in the test dataset 108 to calculate the accuracy value 226.

The error component 238, when executed by the processor 204, causes the processor 204 to calculate an aggregate accuracy value for each of the tiles based on the calculated accuracy values 226 of the positioned observations assigned thereto in the test dataset 108. For example, the error component 238 groups the calculated accuracy values 226 of the test dataset 108 per tile, and calculates the aggregate accuracy value for each tile using the grouped accuracy values 226.

Figure 7:
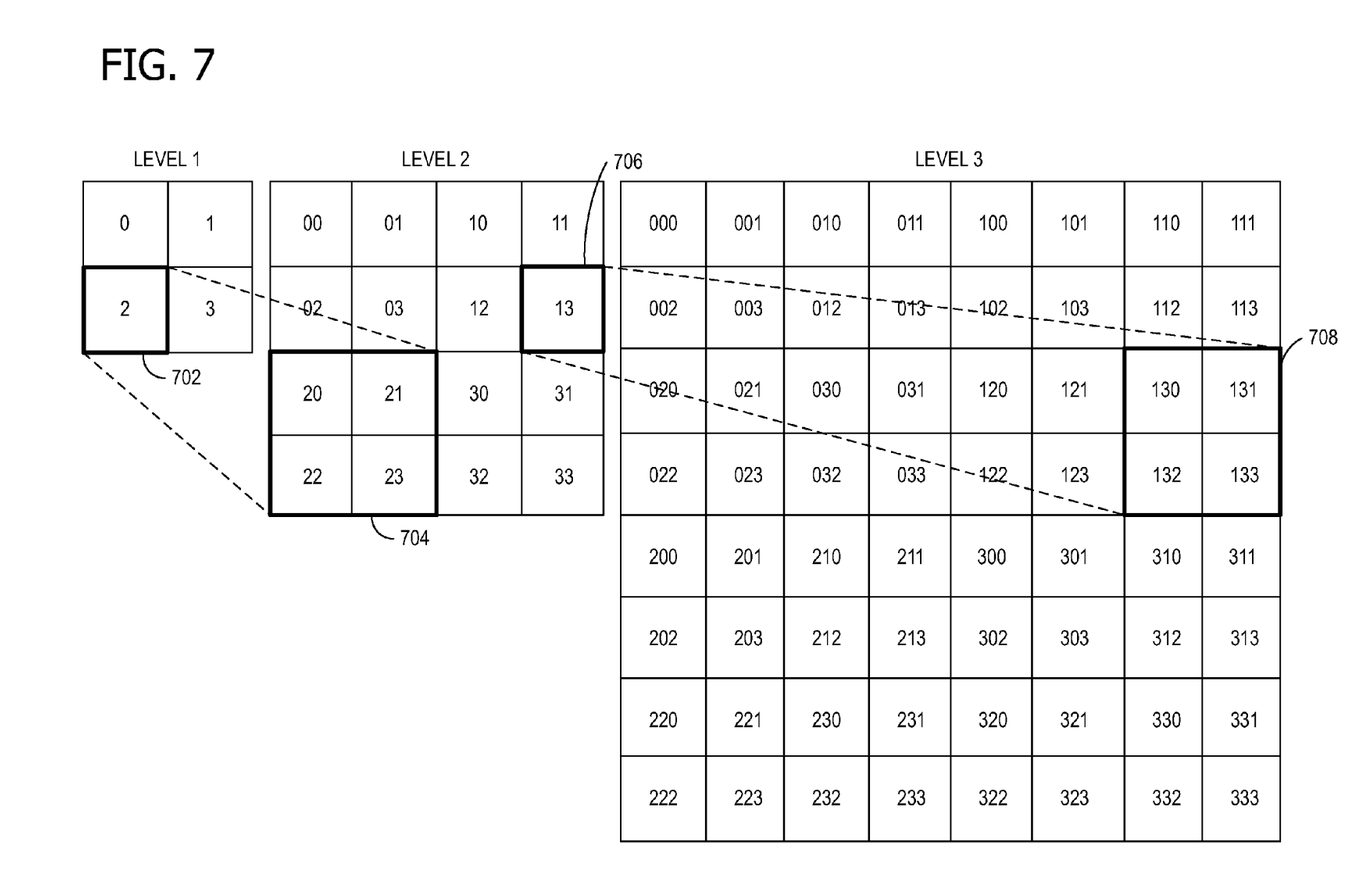
FIG. 7 is an exemplary diagram illustrating geographic tiles at three levels of spatial resolution.

The scaling component 240, when executed by the processor 204, causes the processor 204 to adjust a size of the tiles to analyze the accuracy values 226 aggregated by the error component 238. The size corresponds to one of a plurality of levels of spatial resolution. FIG. 7 illustrates varying levels of spatial resolution. As the size of the tiles changes, aspects of the disclosure re-calculate the aggregate accuracy values, and other analytics, for each of the tiles as described herein.

The characterization component 242, when executed by the processor 204, causes the processor 204 to calculate data quality attributes and data density attributes for the crowd-sourced positioned observations 102. Exemplary data quality attributes and exemplary data density attributes are described below with reference to FIG. 4. Further, the error component 238 may perform a trend analysis on the data quality attributes and the data density attributes calculated by the characterization component 242. The trend analysis illustrates how these statistics evolve over time. For example, for a given tile, the trend analysis shows how fast the observation density increases or how the error distance changes over time.

In some embodiments, the characterization component 242 compares the calculated aggregate accuracy values to beacon density in for example, a scatter plot.

Figure 3:
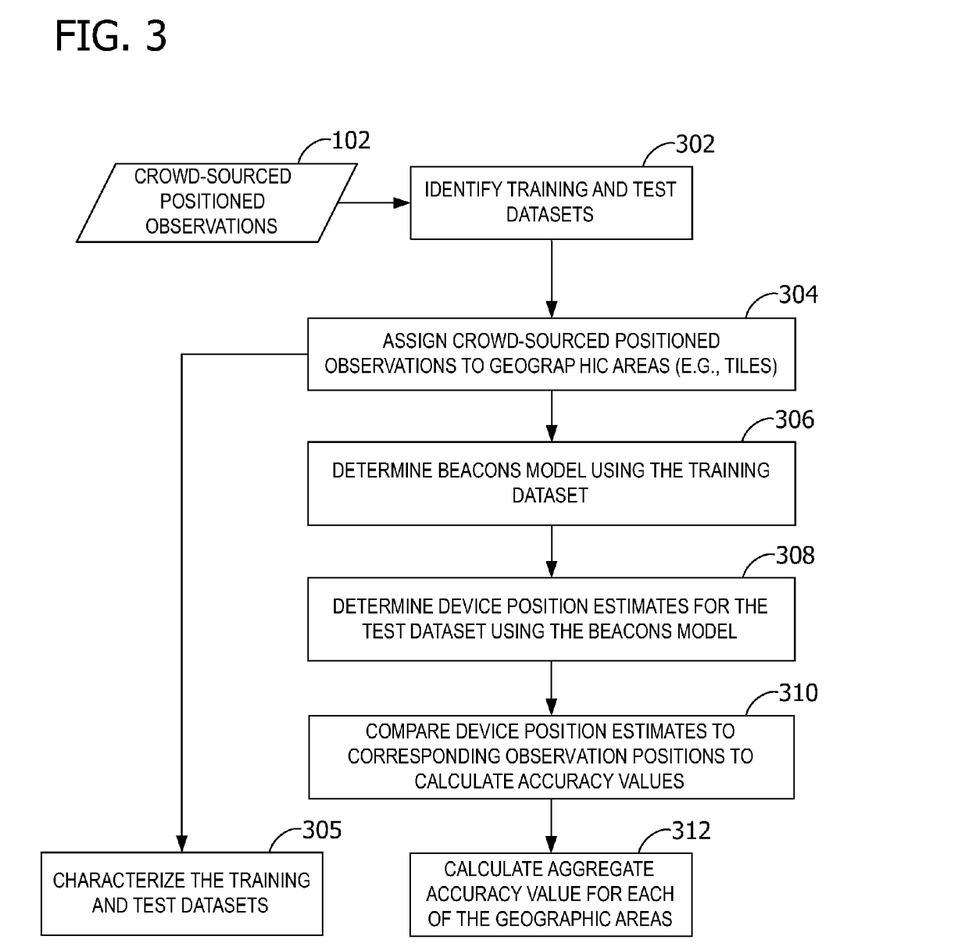
FIG. 3 is an exemplary flow chart illustrating operation of the computing device to calculate aggregate accuracy values associated with performance of position determination methods.

Referring next to FIG. 3, an exemplary flow chart illustrates operation of the computing device 202 (e.g., cloud service) to calculate aggregate accuracy values associated with performance of position determination methods in some embodiments, the operations illustrated in FIG. 3 are performed by a cloud service such as a position determination service. At 302, the training dataset 106 and the test dataset 108 are identified. For example, the crowd-sourced positioned observations 102 are divided into the training dataset 106 and the test dataset 108. The crowd-sourced positioned observations 102 may be divided based on the observation times associated therewith. For example, the training dataset 106 may include the crowd-sourced positioned observations 102 that are older than two weeks, while the test dataset 108 may include the crowd-sourced positioned observations 102 that are less than two weeks old. Aspects of the disclosure contemplate, however, any criteria for identifying the training dataset 106 and the test dataset 108. For example, the positioned observations 102 may be divided based on one or more of the following: geographic area, type of observing computing device 210, position data quality, mobility of observing computing device 210, received signal strength availability, and scan time difference (e.g., between the ends of Wi-Fi and GPS scans).

Further, in some embodiments, the crowd-sourced positioned observations 102 are pre-processed to eliminate noisy data or other data with errors. For example, the crowd-sourced positioned observations 102 may be validated through data type and range checking and/or filtered to identify positioned observations 102 that have a low mobility indicator.

Each of the crowd-sourced positioned observations 102 has an observing computing device 210 (e.g., a mobile computing device) associated therewith. At 304, the crowd-sourced positioned observations 102 are assigned to one or more geographic areas. The crowd-sourced positioned observations 102 may be assigned based on a correlation between the geographic areas and the observation positions 214 associated with each of the crowd-sourced positioned observations 102.

At 306, the beacons model is determined from the training dataset 106. In embodiments in which beacon position estimation is contemplated, beacon position estimates representing the estimated locations of the beacons 212 are calculated as part of the beacons model 222. The beacon position estimate for each beacon in 212 is determined based on the observation positions 214 of the observing computing devices 210 in the positioned observations in the training dataset 106 that include the beacon in the beacons 212. The beacon position estimate is calculated by executing a selection of at least one of the modeling algorithms 228.

At 308, device position estimates 224 for the observing computing devices 210 associated with the positioned observations in the test dataset 108 are determined. For example, the device position estimate 224 for the observing computing device 210 in one of the positioned observations in the test dataset 108 is determined based on the beacons model 222. The device position estimates 224 are calculated by executing a selection of at least one of the position inference algorithms 230.

At 310, for each of the positioned observations in the test dataset 108, the determined device position estimate 224 is compared to the observation position 214 of the observing computing device 210 associated with the positioned observation. The comparison produces the accuracy value 226. In some embodiments, the accuracy value 226 represents an error distance, a distance between the observation position 214 of the observing computing device 210 and the calculated device position estimate 224 of the observing computing device 210, or any other measure indicating accuracy.

At 312, for each of the geographic areas, the accuracy values 226 associated with the positioned observations assigned to the geographic area from the test dataset 108 are combined to calculate an aggregate accuracy value. For example, a mean, median, cumulative distribution function, trend analysis, or other mathematical function may be applied to the accuracy values 226 for each of the geographic areas to produce the aggregate accuracy value for the geographic area.

In some embodiments, the training dataset 106 and the test dataset 108 are characterized or otherwise analyzed to produce dataset analytics at 305. Exemplary dataset analytics include data quality attributes, data density attributes, and an environment type (e.g., rural, urban, dense urban, suburban, indoor, outdoor, etc.) for each of the geographic areas. Further, the performance of the selected modeling algorithm 228 and the selected position inference algorithm 230 may be analyzed to produce quality analytics. In some embodiments, the dataset analytics are correlated to the quality analytics to enable identification and mapping between qualities of the input data to the resulting performance of the location methods.

Figure 4:
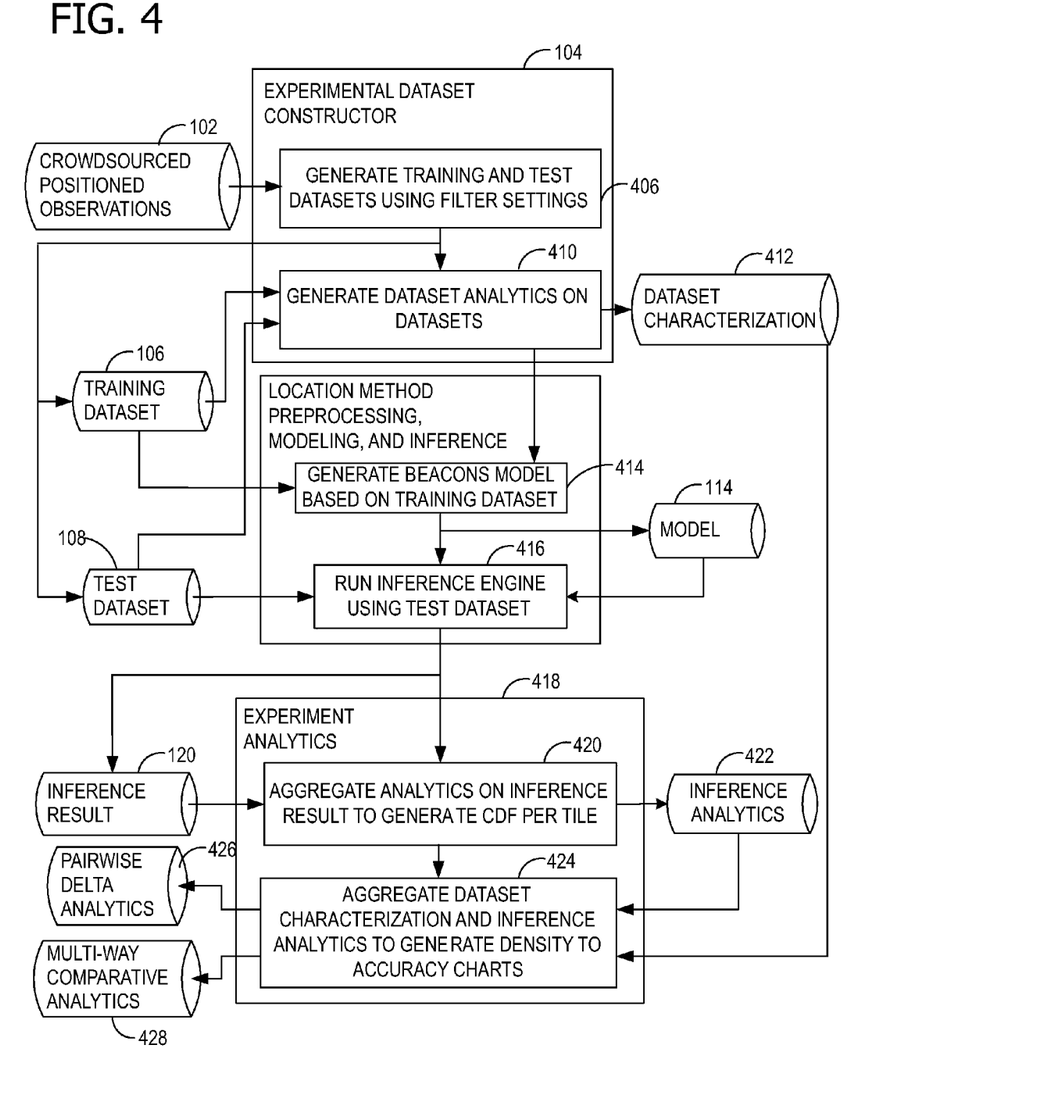
FIG. 4 is an exemplary block diagram illustrating a pipeline for performing analytics on position determination methods using datasets derived from positioned observations.

Referring next to FIG. 4, an exemplary block diagram illustrates a pipeline for performing analytics on position determination methods using datasets derived from positioned observations 102. The experimental dataset constructor 104 takes crowd-sourced positioned observations 102 and generates the training dataset 106 and the test dataset 108 based on, for example, filter settings at 406. Dataset analytics are generated for the training dataset 106 and the test dataset 108 at 410. The dataset analytics are stored as dataset characterizations 412.

Exemplary dataset analytics include characterizations in terms of one or more of the following, at various levels of spatial resolutions: cumulative distribution function, minimum, maximum, average, median, and mode. The dataset analytics include data quality attributes, data density attributes, and environment type. Exemplary data quality attributes include one or more of the following: horizontal estimated position error (HEPE), speed/velocity distribution, heading distribution, and delta time stamp. The HITE represents the estimated 95% position error (e.g., in meters). The delta time stamp represents the difference (e.g., in milliseconds) between the completion of a Wi-Fi access scan and a GPS location fix. Exemplary data density attributes include one or more of the following: observation density (e.g., the number of observations per square kilometer), beacon density (e.g., the number of unique beacons 212 per square kilometer), distribution of the number of beacons 212 per scan, and distribution of observations per beacon 212.

Preprocessing, modeling, and inference are performed specific to a particular positioning method. For example, the positioning method includes at least one of the modeling algorithms 228 and at least one of the position inference algorithms 230. Models 114 are generated at 414 based on the training dataset 106. The inference engine 118 uses the models 114 at 416 to process the test dataset 108 and produce inference results 120.

Experiment analytics 418 are next performed. Analytics on the inference results 120 are aggregated at 420 to generate, for example, a cumulative distribution function per geographic tile. The aggregated analytics are stored as inference analytics 422. The inference analytics combine different inference results 120 together and aggregate them by geographic tile. The dataset characterization and inference analytics are aggregated to generate, for example, density to accuracy charts at 424. Further, pairwise delta analytics 426 and multi-way comparative analytics 428 may also be performed. The pairwise delta analytics 426 and the multi-way comparative analytics 428 enable finding a correlation between training data properties and error distance analytics reports. The result of this data may be visually analyzed as a scatter graph or pivot chart. For example, the pairwise delta analytics 426 examine the difference between error distances of two alternative methods versus a data metric such as beacon density. In another example, the multi-way comparative analytics 428 illustrate the relative accuracy of multiple experiments given a particular data quality or density metric. Other analytics are contemplated, such as per beacon analytics.

In some embodiments, the experiment analytics have several levels of granularity. There may be individual inference error distances, intra-tile statistics (e.g., 95% error distance for a given tile), inter-tile analytics (e.g., an accuracy vs. beacon density scatter plot for an experiment), and inter-experiment comparative analytics.

Exemplary intra-tile statistics include one or more of the following: test dataset analytics (e.g., beacon total, beacon density, beacon count per inference request), query success rate, cumulative distribution function (e.g., 25%, 50%, 67%, 90%, and 95%), and other statistics such as minimum, maximum, average, variance, and mode. Exemplary inter-tile analytics are summarized form training data over a plurality of geographic tiles and may include scatter plots illustrating one or more of the following: error vs. observation density, error vs. observed beacon density, error vs. number of access points used in the inference request, and error vs. data density and data quality.

Aspects of the disclosure may further relate dataset analytics to accuracy analytics. In some embodiments, there is a continuous model (e.g., no estimation of beacon position) and a discrete model, although other models are contemplated. In the continuous model. D is a data density function and Q is a data quality function. The function D is a data density function of observation density, beacon density, and the distribution of the number of access points per scan. The function Q is a data quality function of HEPE distribution, speed distribution, delta time stamp distribution, and heading distribution. For a given training dataset 106 and a particular geographic tile, aspects of the disclosure calculate the data density indicator and the data quality indicator using the functions D and Q. When combined with a selected accuracy analytic A such as 95% error distance, aspects of the disclosure operate to create a three-dimensional scatter plot, where each data point in the plot is of the form (X=D, Y=Q, Z=A).

In the discrete model, for a particular training dataset 106, aspects of the disclosure classify each geographic tile that covers an area of the training dataset 106 as (D, Q), where values for D and Q are selected from a discrete set of values (e.g., low, medium, and high). As crowd sourced data grows in volume and improves in quality, more tiles are expected to move from (D=low, Q=low) to (D=high, Q=high).

Figure 5:
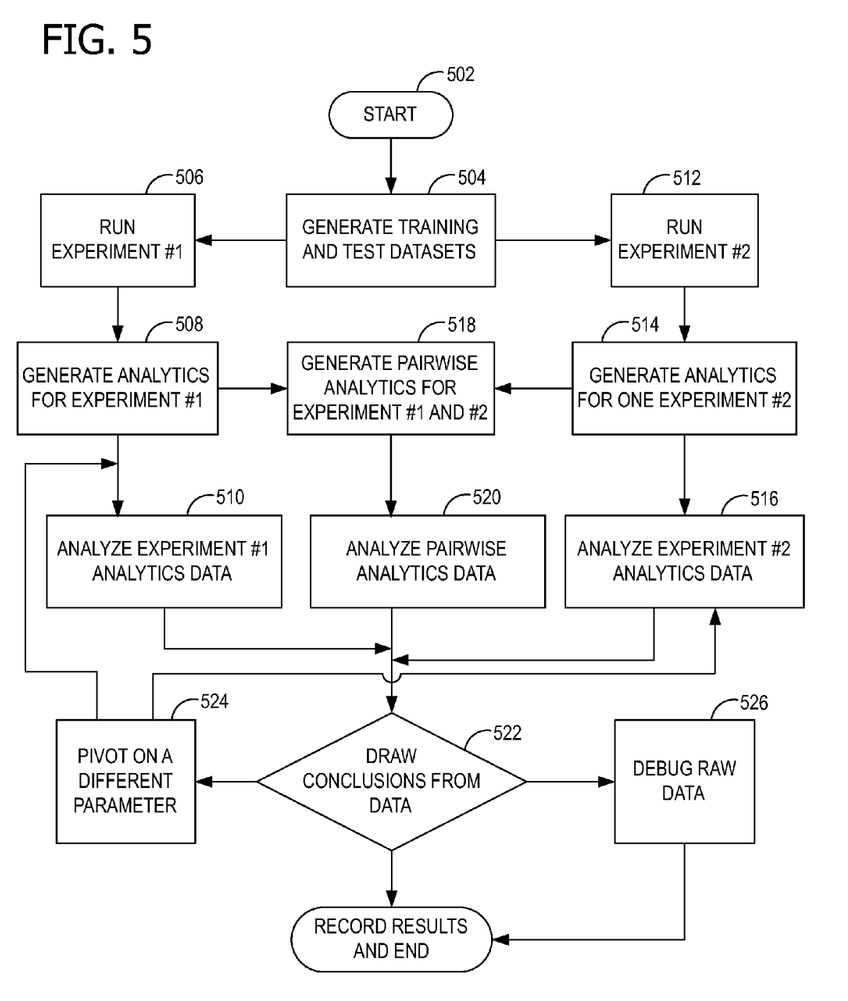
FIG. 5 is an exemplary experiment process flow diagram illustrating comparison of the performance of two experiments using different position determination methods.

Referring next to FIG. 5, an exemplary experiment process flow diagram illustrates comparison of the performance of two experiments using different position determination methods. The process begins at 502. The training dataset 106 and the test dataset 108 are generated at 504 from the crowd-sourced positioned observations 102. At 506, a first experiment is conducted using a particular positioning method (e.g., using at least one of the modeling algorithms 228 and at least one of the position inference algorithms 230 on a particular training dataset 106 and test dataset 108). Performance analytics are generated for the first experiment at 508, as described herein, and then analyzed at 510. For example, an error distance graph per tile may be created.

At 512, a second experiment is conducted using another positioning method (e.g., different modeling algorithm 228 and/or different position inference algorithm 230 from the first experiment). Performance analytics are generated for the second experiment at 514, as described herein, and then analyzed at 516. Pair-wise analytics are generated for the first and second experiments at 518, and then analyzed at 520. For example, an error distance difference per tile may be created for each of the positioning methods to enable identification of the positioning method providing the better accuracy (e.g., smaller error distance).

At 522, the analyzed analytics data may be reviewed to draw conclusions such as whether a correlation can be seen between any of the characteristics of the training dataset 106 and error distance, whether one positioning method performs better than another for a particular combination of data quality and data density, and the like. If anomalies are detected (e.g., two tiles with similar observation density show varied error distance), the raw positioned observation data may be debugged at 526. Further, the experiments may be re-run after pivoting on a different parameter at 524. For example, if there is no correlation between observation density and error distance, the experiments may be re-run to determine whether there is a correlation between HEPE and error distance.

In some embodiments, the operations illustrated in FIG. 5 may generally be described as follows. In a first experiment, a first one of a plurality of the modeling algorithms 228 is selected and executed with the training dataset 106 as input. This results in the creation of the beacons model 222 based on the training dataset 106. A first one of a plurality of position inference algorithms 230 is selected and executed with the test dataset 108 and the beacons model 222 as input. This results in creation of device position estimates 224 for the observing computing devices 210. The device position estimates 224 are compared to the observation positions 214 of the observing computing devices 210 to calculate accuracy values 226. The accuracy values 226 are assigned to the geographic areas based on the observation position 214 of the corresponding positioned observations in the test dataset 108. Aggregate accuracy values are created by combining the accuracy values 226 from each of the geographic areas.

In a second experiment, the beacons model 222 is recalculated using a second selected modeling algorithm 228 and the device position estimates 224 are recalculated using a second selected position inference algorithm 230. The aggregate accuracy values are re-calculated for each of the geographic areas to enable a comparison of the selected modeling algorithms 228 and the selected position inference algorithms 230 between the first experiment and the second experiment.

In some embodiments, the computing selects the first or second modeling algorithms 228 and/or the first or second position inference algorithms 230 as the better-performing algorithm based on a comparison between the aggregated accuracy values of the first experiment and the second experiment.

In some embodiments, a size of one or more of the geographic areas may be adjusted. The aggregate accuracy value, or other quality analytics, is calculated for each of the re-sized geographic areas by re-combining the corresponding accuracy values 226.

Figure 6:
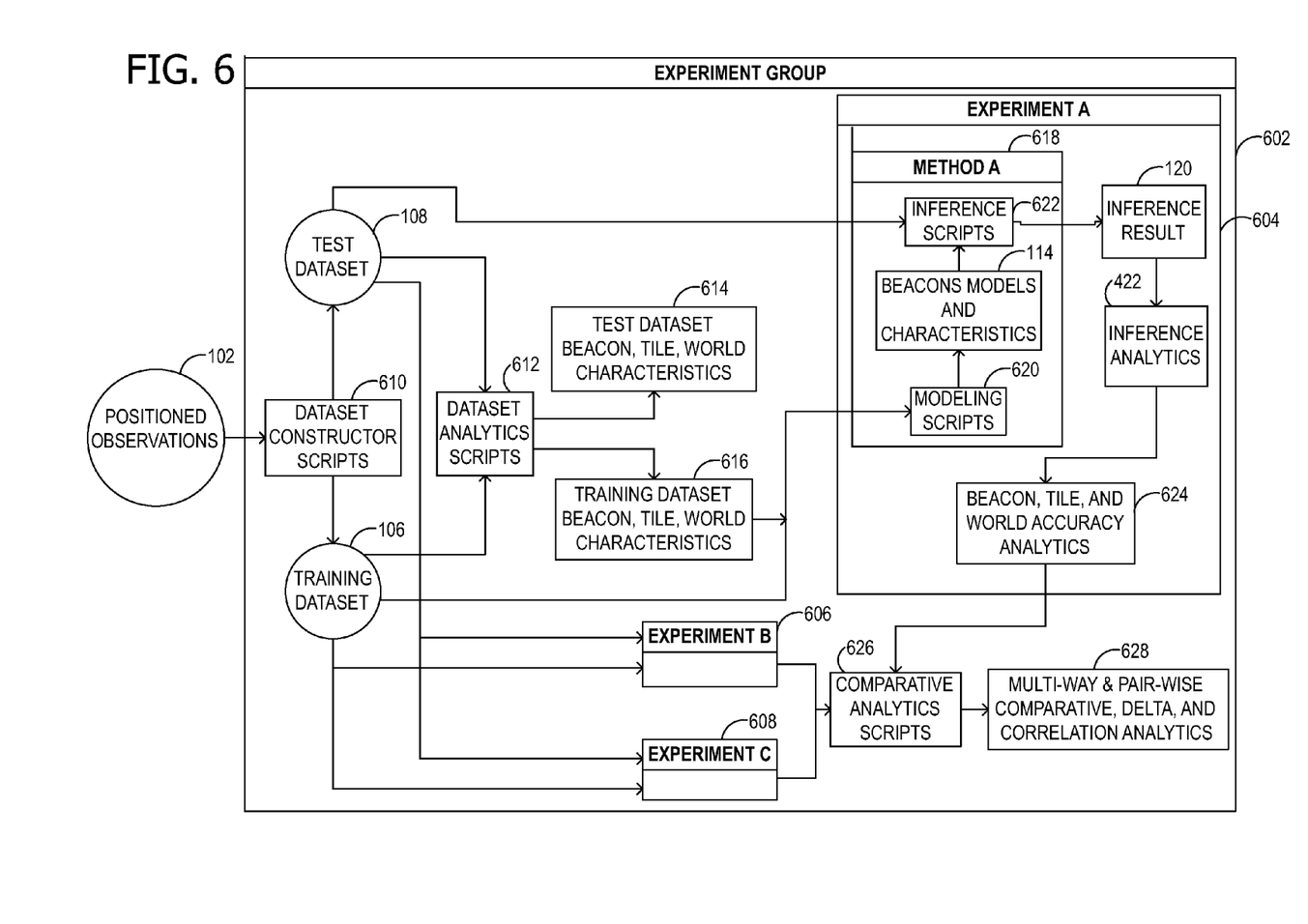
FIG. 6 is an exemplary block diagram illustrating an experiment group of three experiments for generating comparative analytics.

Referring next to FIG. 6, an exemplary block diagram illustrates an experiment group 602 of three experiments for generating comparative analytics. Each of the Experiment A 604, Experiment B 606, and Experiment C 608 represent the application of a selected modeling algorithm 228 and a selected position inference algorithm 230 to a particular training dataset 106 and test dataset 108. Dataset constructor scripts 610 create the training dataset 106 and the test dataset 108 from the positioned observations 102. Dataset analytic scripts 612 create training dataset characteristics 616 and test dataset characteristics 614 at the beacon, tile, and world (e.g., multiple tiles) levels to characterize the output at multiple levels of spatial resolution. In this way, aspects of the disclosure characterize the input data at multiple levels of spatial resolution.

Experiment A 604 applies a particular location method 618. This includes executing modeling scripts 620 to create models 114. Inference scripts 622 apply the models 114 to the test dataset 108 to create the inference results 120. Inference analytics are obtained from the inference results 120 to produce accuracy analytics 624 at the beacon, tile, and world (e.g., multiple tiles) levels.

Experiment B 606 and Experiment C 608 are performed using different location methods. Comparative analytic scripts 626 are performed on the accuracy analytics 624 from Experiment A 604 as well as the output from Experiment B 606 and Experiment C 608. Multi-way and pair-wise comparative, delta, and correlation analytics are performed at 628.

Referring next to FIG. 7, an exemplary diagram illustrating geographic tiles at three levels of spatial resolution. The different spatial regions may have very different data density, data quality, and radio frequency propagation environment. In the example of FIG. 7, the three levels of spatial resolution include Level 1, Level 2, and Level 3. Tile 702 in Level 1 corresponds to tiles 704 in Level Tiles 706 in Level 2 correspond to tiles 708 in Level 3. An operator is able to drill down into the tiles to partition the data based on zooming, where the data is averaged within each tile.

Aspects of the disclosure may also relate to the optimization of the location methods (modeling algorithms 228 and/or the first and second position inference algorithms 230) for each geographic area (e.g. tiles). This can be accomplished by performing for a given location method the process described above in FIG. 3 multiple times for the same geographic area using the given location method. The data analytics that are obtained each time the process is performed can be used as feedback to adjust the particular beacons model and interference algorithm that is being used. A location model will typically be optimized by minimizing the error distances computed between observed device positions and determined device positions By refining the location methods in this iterative manner based on error feedback they can each be optimized at the resolution of each geographic area.

The error characteristics for a location method Mi when applied to a particular tile t may be denoted (EMi,t), The error characteristic may be expressed in a number of different ways. For example, the error characteristic may be expressed in terms of the percentage of test data results that falls within a specified error distance. For instance, an error of 95%/67% error distance indicates that 95% of the test data results have errors falling within a first specified error distance and 67% of the test data results have errors falling within a second, lower error distance. As another example, the error can be expressed in terms of the cumulative distribution function (CDF) for method Mi applied to tile t.

Aspects of the disclosure may further relate to the determination of device position estimates for future inference requests from computing devices after the beacons models and inference algorithms have been developed and optimized at tile-level resolution using the training and test data in some embodiments, the device position estimates can be determined for these inference requests by first estimating the tile in which the position is likely to fall using, for example, a baseline location method but some embodiments, once such a tile has been identified, one or more additional location methods may be used to refine the location within the tile using one or more additional methods which are particularly suited for use in the identified tile.

The location method or methods used to locate the position within a tile of a computing device making an inference request may be determined in a variety of different ways. For example, in one simple case, the location method Mi may be selected which has the minimum E(Mi,t) for that tile. In other embodiments some combination of two or more methods may be employed.

In one particular embodiment for instance, a weighted combination of two or more methods may be used. The methods that are selected may be those that have an error characteristic E(Mi,t) below some threshold value for the tile in which the mobile device is anticipated to be located. The weights may be selected such that location methods having greater error characteristics E(Mi,t) are given less weight. In some cases the weights may be selected using one or more heuristics. Of course, since the error characteristic for a given location method will in general vary from tile to tile, the weights assigned to each location method will in general also differ from tile to tile.

In another embodiment, the weighting function assigned to the location methods that are used for a given tile may be based at least in part on the number of beacons identified in an inference request which have a received signal strength (RSS) for the beacons above a threshold value. Since some location methods may be more effective than others when more beacons are available, these location methods may be given a higher weight when the appropriate number of beacons are available.

Figure 8:
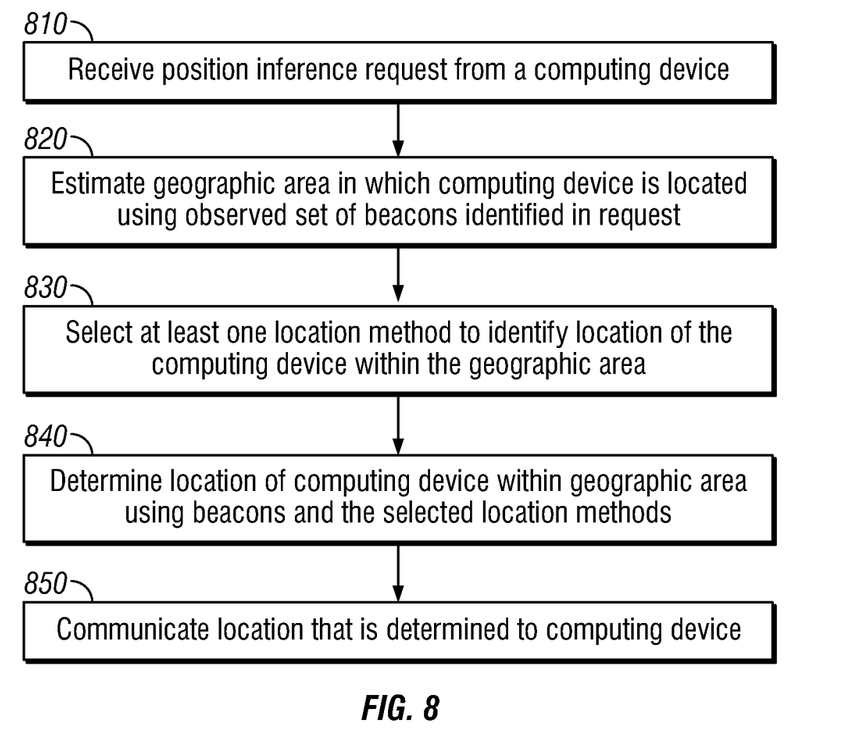
FIG. 8 is an exemplary process flow diagram illustrating how the location of a mobile device making an inference request may be determined.

FIG. 8 is an exemplary process flow diagram illustrating how the location of a mobile device making an inference request may be determined. The method begins by receiving at step 810 a position inference request from a computing device. The position inference request identifies a set of beacons observed by the computing device. Using the set of beacons, a geographic area is estimated in which the computing device is located at step 820. At least one location method (e.g., a beacons model and a position inference algorithm) is selected in step 830 to identify a location of the computing device within the geographic area. In some cases two or more location methods are selected and their results combined using a combining function to determine the location of the computing device within the geographic area. The combining function may be determined in any suitable manner such as by using heuristics, for example. Moreover, the combining function may be expressed in a variety of different ways. For instance, the combining function may be expressed as a weighting function that assigned different weights to different location methods. The location of the computing device within the geographic area is determined at step 840 using the set of beacons and the selected location method. The location that is determined is communicated to the computing device at step 850.

Aspects of the disclosure may further relate to the creation of cacheable data to enable mobile computing devices such as mobile communication devices to obtain its location locally without the need to communicate with the cloud service in real-time at all times. In this way the mobile computing devices can avoid the need to send inference requests to obtain location information. This can be accomplished by downloading to the computing device a suitable number of beacons models and interference algorithms to allow the computing device to determine its location using these models and algorithms as well as the set of beacons its observes.

Figure 9:
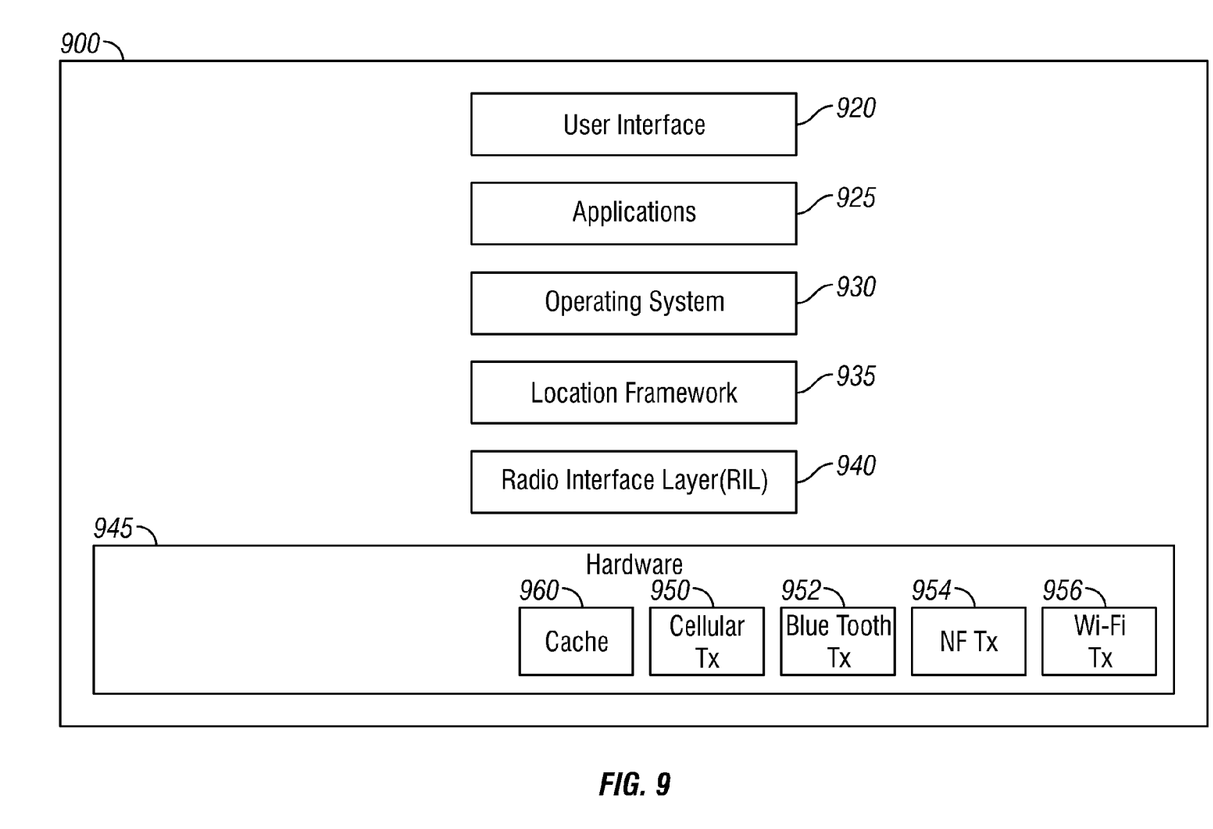
FIG. 9 shows one particular illustrative architecture of the major functional components of a mobile computing device that is configured as a mobile communications device.

FIG. 9 shows one particular illustrative architecture 900 of the major functional components of a mobile computing device that is configured as a mobile communications device. Although the architecture 900 shown in FIG. 9 is particularly adapted for a mobile phone, the fundamental principles it illustrates can be expected to have general applicability to other platforms such as, for example, a laptop PC, a netbook, a tablet or the like. In this exemplary embodiment, a UI 920 is provided by the architecture 900 to support user interactivity and facilitate an effective user experience, and will typically be embodied as a graphical user interface. A variety of applications reside on the mobile communication device, which applications are collectively indicated by reference number 925. Some applications that reside on the mobile communication device may offer location-based services which require the mobile communication device to determine its location as well as possibly a history of locations previously visited. Such location-based services may integrate a mobile device's current or historical location or position with other information so as to provide added value to a user, Examples of such applications include map applications, traffic alert applications, geo-tagging applications (to e.g., tag a recorded image with its location) and other applications that identify for the user nearby points-of-interest (e.g. restaurants, stores).

Supporting the applications 925 in the architecture 900 are an operating system 930, a location framework layer 935, a radio interface (RIL) layer 940 and a hardware layer 935. In this exemplary embodiment, the operating system 930 is particularly adapted to operate on a resource-limited device and may comprise, for example, Windows Phone. The location framework layer 935 provides logic and control functions that capture the location information obtained from the hardware layer 945 and makes it available to any of the applications 925 that require it. The RIL layer 940 is a set of APIs providing a level of abstraction between the radio on a mobile phone and the software of the mobile phone. That is, the RIL layer 940 serves as a hardware adaptation layer, i.e., a layer that isolates the specifics of a particular mobile system/hardware from the bulk of the software system. In this way various software solutions may be adaptable to multiple different mobile systems and radios.

The hardware layer 935 provides an abstraction of the physical hardware implemented on the mobile communication device and will typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. The aforementioned physical hardware components are not illustrated in layer 935 since they are not pertinent to the present discussion. However, the following hardware components are depicted in FIG. 9 since they may be pertinent to the discussion that follows.

In particular, the hardware layer 935 of the mobile communication device includes one or more wireless transceivers. In this implementation mobile communication device 900 includes a cellular radio transceiver 950, a Bluetooth transceiver 952, a Wi-Fi transceiver 956 and a cache 960. The wireless transceivers allow the mobile communication device to communicate over wireless networks by establishing communication with one or more beacons associated with the wireless networks. The radio 950 includes such conventional components as a transmitter, receiver, antenna, and so on. Among other things, the cache 960 may be used to store the various location methods (e.g., beacons models and position inference algorithms) used by the mobile device to determine its location. Thus, the cache 960 may include a subset of the information located in the computing device 202 shown in FIG. 2. In this way the mobile communication device does not need to exchange messages with the computing device 202 each and every time it wants to obtain location information using the set of beacons it observes.

In addition to the location models, the data cached by the computing device may also include a combining function and, if the combining function is a weighting function, any weighting values that may be needed. The location models and combining functions that are cached may be optimized for multiple tiles. In some implementations the cache data is optimized for a number of tiles in which the mobile computing device is most likely to be located.

The cache data may include an expiration time so that it is no longer usable after a length of time has elapsed over which the performance of the data is likely to be significantly degraded. In addition, the cloud serve may refresh the cache data on a periodic basic (e.g., daily, weekly) to ensure that optimized location methods continue to be available to the mobile computing device. Moreover, in some embodiments the cloud service may be able to invalidate the cache data at any time if it determines that the data can longer be used to obtain accurate location information.

Additional Examples

At least a portion of the functionality of the various elements in FIG. 1, FIG. 2, and FIG. 4 may be performed by other elements in the figures, or an entity (e.g., processor, web service, server, application program, computing device, etc.) not shown in the figures.

In some embodiments, the operations illustrated in FIG. 3 and FIG. 5 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media, Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described, herein but within the scope of aspects of the invention constitute exemplary means for creating models 114 based on the training dataset 106, and exemplary means for comparing the accuracy of different modeling algorithms 228 and different position inference algorithms 230 based on the aggregated accuracy values for the tiles.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A mobile communication device, comprising:
one or more wireless transmitters and receivers for communicating over a wireless communication network using one or more beacons associated with the wireless communication network;
one or more processors for executing machine-executable instructions;
one or more machine-readable storage media for storing the machine-executable instructions, the instructions including beacons models and position inference algorithms received from a service over the wireless communication network and cached on the mobile communication device, at least one of the beacons models being determined using crowd-sourced positioned observations in a training dataset, each of the crowd-sourced positioned observations including a set of beacons observed by one of a plurality of computing devices and an observation position of the computing device when the set of beacons is being observed; and
processing logic configured, based on a set of observed beacons with which the one or more wireless transmitters and receivers communicate, to determine the location of the mobile communication device within a geographic area using at least one of the received and cached beacon models and position inference algorithms.

2. The mobile communication device of claim 1 in which the instructions further include a combining function based on data analytics obtained for geographic tiles.

3. The mobile communication device of claim 2 in which the combining function includes a weighting function.

4. The mobile communication device of claim 3 the instructions further comprising selecting the weighting function based on an error characteristic associated with each selected location method such that a location method having a lower error characteristic within the geographic area is more highly weighted than a location method having a higher error characteristic within the estimated geographic area.

5. The mobile communication device of claim 3 the instructions further comprising selecting the weighting function based at least in part on a number of beacons identified in the position inference request.

6. The mobile communication device of claim 1 in which at least one of the receivers periodically receives updated beacons models and position inference algorithms from the service which are stored in the memory area.

7. The mobile communication device of claim 1 in which the instructions further include a combining function specifying how to combine location results obtained using different cached beacons models and position inference algorithms.

8. The mobile communication device of claim 1 in which at least one of the beacons models or the position inference algorithms stored in the memory area has an expiration time after which it is no longer usable.

* * * * *